United States Patent [19]
Nakagawa et al.

[11] 3,917,896
[45] Nov. 4, 1975

[54] INDUCTION MELTING FURNACE

[75] Inventors: Ryuichi Nakagawa; Shiro Yoshimatsu, both of Tokyo; Akira Fukuzawa, Yokohama; Akira Sato, Omiya; Tatsuro Mitsui, Sagamihara; Takuya Ueda, Zushi; Tsuyoshi Ozaki, Tokyo, all of Japan

[73] Assignee: National Research Institute For Metals, Tokyo, Japan

[22] Filed: Sept. 13, 1974

[21] Appl. No.: 505,664

Related U.S. Application Data

[62] Division of Ser. Nos. 404,901, Oct. 10, 1973, and Ser. No. 484,153, June 28, 1974, which is a division of Ser. No. 404,901.

[30] Foreign Application Priority Data
Nov. 11, 1972 Japan............................. 47-101125

[52] U.S. Cl. .............................. 13/27; 13/29; 13/33

[51] Int. Cl.²............................................ H05B 5/16
[58] Field of Search ..................... 13/33, 26, 27, 29; 219/10.75, 10.77

[56] References Cited
UNITED STATES PATENTS

| | | | |
|---|---|---|---|
| 2,937,789 | 5/1960 | Tama................................. | 13/33 X |
| 3,483,301 | 12/1969 | Duca................................. | 13/29 X |
| 3,579,324 | 5/1971 | Kennedy............................. | 13/26 |
| 3,602,625 | 8/1971 | Duca................................. | 13/27 |

Primary Examiner—R. N. Envall, Jr.
Attorney, Agent, or Firm—Sherman & Shalloway

[57] ABSTRACT

An induction melting furnace for melting metals or alloys including an auxiliary induction heating coil in a material charging part. The material charging part is additionally heated to promote dissolving of the material in molten metal.

1 Claim, 2 Drawing Figures

INDUCTION MELTING FURNACE

This is a division, of application Ser. No. 404,901, filed Oct. 10, 1973, and is a division of application Ser. No. 484,153, filed June 28, 1974, which is itself a divisional of application Ser. No. 404,901.

BACKGROUND OF THE INVENTION

This invention relates to an induction melting furnace for melting metals or alloys continuously.

TECHNICAL CONSIDERATIONS AND PRIOR ART

A furnace, U-shaped as a whole and adapted to heat metals continuously, comprising a melting section including an induction coil for melting the material by induction heating, a material changing part connected to one end of said coil and extending upwardly, and a molten metal effluent part connected to the other end thereof and extending upwardly has already been known. This conventional furnace has the advantage that the working environment can be maintained in good condition and the operation can be performed continuously, because metals are heated by electromagnetic induction heating and only the material charging opening and the molten metal effluent opening are open parts. However, it takes time to melt the charged material, and as a result, troubles tend to occur in the charging part. For example, when small fragments of the material are charged, bridging tends to occur, and when a large mass of the material is fed, the amount of the molten metal effluent is abruptly increased.

OBJECTS AND ADVANTAGES OF THE PRESENT INVENTION

Accordingly, it is an object of this invention to provide a continuous induction melting furnace improved so as to expedite the melting of the charged material.

Another object of this invention is to provide an improved induction melting furnace by which it is possible to automatically maintain the rate and temperature the molten metal effluent fed from the melting furnace to the subsequent step.

According to this invention, there is provided an induction melting furnace for continuously melting metals or alloys comprising a material charging part, a melting part including an induction coil for melting the charge in the furnace by induction heating, and a molten metal discharge part, said material charging part including an auxiliary induction coil so as to additionally heat the material in the material charging part and the molten metal thereby to promote the melting of the material.

The auxiliary induction coil used in the apparatus of this invention generates heat in the material at the material charging part and in the molten metal by its electromagnetic induction activity, thereby expediting the melting of the material and preventing any possible trouble in the material charging part. Furthermore, the auxiliary induction coil functions to give upward and downward directed forces to the material charging part by using a pinching effect to push the molten metal towards the outlet of the molten metal outlet. The coil also agitates the molten metal. These functions can be controlled by a control system to be described hereinbelow.

The induction melting furnace of this invention may include a temperature control system for effluent molten metal which comprises an induction coil for the melting section, a temperature detecting device for the molten metal effluent part and a power regulating device for the induction coil of the melting section. This temperature control system acts to control the induction heating of the melting section so as to maintain the temperature of the effluent molten metal constant. This is a result of the above power regulating device being actuated according to the signal issued on the basis of the temperature of the molten metal effluent which has been detected by the temperature detecting device, and thus regulates the power to be supplied to the induction coil for the melting section.

The above temperature control system for the molten metal effluent may also contain a power detecting device for the auxiliary induction coil, which detects heat generated by the auxiliary induction coil from the electric power supplied to the auxiliary induction coil and based on this, sends a signal to the power regulating device for the induction coil at the melting section. According to this signal, the regulating device is actuated.

The induction melting furnace of this invention has a system for controlling the flow rate of the molten metal effluent and can maintain the flow rate constant. This control system consists of the auxiliary induction coil, a device for detecting the flow rate of the effluent molten metal, a device for detecting the liquid level of the material charging section, and a device for regulating electric power supplied to the auxiliary induction coil. By utilizing a change-over device, the auxiliary induction coil can supply both a monophase alternating current and a polyphase alternating current. Where a monophase alternating current is supplied, heat based on electromagnetic induction is generated in the material at the material charging section and in the molten metal. Consequently, upward and downward directed forces based on a pinch effect are applied to the molten metal. Where a polyphase alternating current is supplied, electromagnetic induction heat is generated along with upwardly and downwardly directed forces based on progressive magnetic field. The above pinch effect and the downwardly directed force based on the progressive magnetic field act to increase the flow rate of the molten metal effluent. On the other hand, the upwardly directed force based on the progressive magnetic field acts to decrease the flow rate of the molten metal effluent. The device for detecting the flow rate of the effluent molten metal or the device for detecting the liquid level of the material charging section sends a signal based on the detected flow rate or liquid level to the device for regulating the electric power supplied to the auxiliary induction coil. This signal provides regulation of electric power supplied to the auxiliary induction coil, and as a result, the above downwardly and upwardly directed forces are controlled so that they maintain a constant rate of the effluent molten metal.

The auxiliary induction coil can also be actuated so as to exert an upwardly directed force on the molten metal at the material charging section for a short period of time in order to facilitate the removal of slag occurring at the material charging section.

The power to be supplied to the induction coil at the melting section and to the auxiliary induction coil may be an alternating current of any desired frequency from low to high frequency.

The electric power regulating device, power detecting device, device for detecting the flow rate of the effluent molten metal, device for detecting the liquid level of the molten metal, and device for changing between a monophase to a polyphase are all known per se.

The induction melting furnace of this invention is suited especially for use as a melting furnace for regulating scrap steel covered by copending patent application No. 404,900, filed Oct. 10, 1973, and having the same inventors and applicants as in the present application. However, it is also applicable to the melting of any metals.

BRIEF DESCRIPTION OF DRAWINGS

The invention will be described below with reference to the accompanying drawings in which.

DETAILED DESCRIPTION OF DRAWINGS

Figure 1:
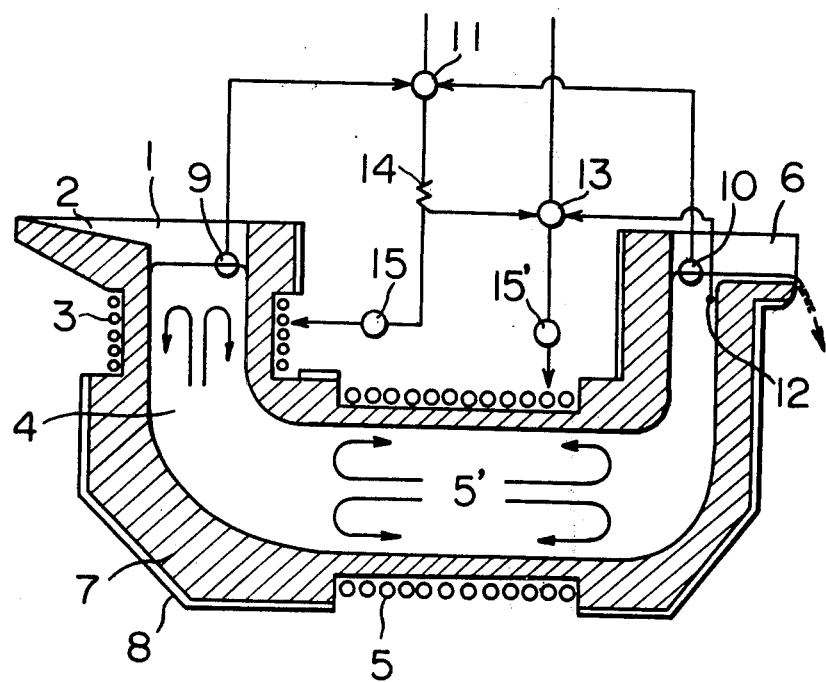
FIG. 1 is a schematic view in longitudinal section of a U-shaped furnace.

Referring to FIG. 1, the furnace consists of a material charging section 1, a melting section 5 and a molten metal effluent section 6 with an auxiliary induction coil 3 provided around the charging section 1. The furnace consists of a space 4 through which molten metal flows, a refractory material 7 and an iron casing supporting the entire furnace. The molten metal flowing space 4 consists of a horizontal section 5' surrounded by the induction coil 5, the material charging section 1 connected perpendicularly to one end thereof, and a molten metal effluent part 6 connected perpendicularly to the other end thereof. The material charging section 1 includes a slag discharging portion 2.

The auxiliary induction coil 3 includes a device 15 for changing a monophase to a polyphase or vice versa, therefore making it possible for the coil to act either as a monophase coil or polyphase coil. This device 15 is connected to an electric source (not shown) through a device 14 for detecting electric power for the auxiliary induction coil and a device 11 for regulating electric power to be supplied to the auxiliary induction coil 3. The regulating device 11 is related to a device 9 for detecting the liquid level of the material charging section 1 and a device 10 for detecting the flow rate of the molten metal effluent, and operates according to the signals issued by the detecting devices 9 and 10.

The induction coil 5 at the melting section is connected to an electric source (not shown) through a device 13 for regulating power supply to the induction coil 5. The regulating device 13 is related to a device 12 for detecting the temperature of the molten metal effluent part and a device 14 for detecting power to be supplied to the auxiliary induction coil 3, and is actuated according to the signals issued by these detecting devices 12 and 14. The induction coil 5 may include a monophase-polyphase change-over device 15' of the same type as in the auxiliary induction coil 3.

In the operation of the induction melting furnace of this invention, the feed metal is transported by a conveyor (not shown), and fed into the charging section 1, after which it comes into contact with molten metal and gradually dissolves in the molten metal. At this time, the material fed to the charging section and the molten metal present in the charging section generate electromagnetic induction heat by the action of the auxiliary induction coil 3. When a monophase alternating current is passed, the molten metal is pushed from the center towards the axial direction of the coil by the pinch effect as shown at the horizontal portion 5', whereupon the molten metal spreads in the circumferential direction and moves backwards along the wall of the furnace, and again returns to the center (the agitation of the molten metal). The molten metal which has moved to the melting section 5 from the charging section 1 generates electromagnetic induction heat by the action of the induction coil 5, and flows out of the effluent part 6 while being maintained at the desired temperature.

When the rate of the effluent molten metal flowing out of the furnace decreases from the prescribed value while a monophase alternating current is being supplied to the auxiliary induction coil 3, the power regulating device 11 acts to increase electric power to be supplied, in response to the signal showing a decrease in liquid level as issued from the detecting device 9 and the signal showing the decrease in the rate of the effluent molten metal as issued from the detecting device 10. This leads to an increase in the downwardly directed force based on the pinch effect, and returning of the rate of the effluent molten metal to the prescribed value. When the flow rate of the molten metal increases from the prescribed value, the reverse operation is performed.

When the rate of flowing metal is decreased from the prescribed value and polyphase alternating current is fed into the auxiliary induction coil 3, the downwardly directed force is acting on the source material and the molten metal present in the material charging section, the regulating device 11 acts to increase the electric power to be supplied, according to the signal showing a decrease in liquid level as issued from the detecting device 9 and the signal showing a decrease in the flow rate of the effluent molten metal as issued from the detecting device 10. As a result, the downwardly directed force exerted on the molten metal is increased and the rate of the effluent molten metal is returned to the prescribed value. When the rate of the effluent molten metal increases from the prescribed value, the reverse operation is performed.

Where the rate of the effluent molten metal decreases or increases from the prescribed value while an upwardly directed force based on the progressive magnetic field is being exerted on the material and molten metal in the material charging part 1, the operation is reverse to the case of the downwardly directed force being exerted.

The direction of force based on the progressive magnetic field can be changed by change-over of the connection so as to change the advancing direction of the magnetic field. The connection per se is known in the art. Whether a monophase or multiphase connection is to be selected in a steady state or which of an upwardly directed or downwardly directed force based on the progressive magnetic field is to be selected depends upon the rate of the flow of the effluent molten metal and the prescribed temperature. When a large mass of the charge material is used, the tendency to increase the flow rate from the prescribed value is predominant, and therefore, it is preferred to choose the upwardly directed force. When the liquid level fluctuates greatly and the flow rate of the effluent molten metal cannot be controlled by the adjustment of the force on the molten metal based on the auxiliary induction coil 3, the same operation performed by the auxiliary induction coil 3 can be performed by providing an electric power regulating device 13 and a monophase-polyphase change-over device 15'. The liquid level at the charging part can also be effected by detecting fluctuations in the power factor of the auxiliary induction coil 3.

The power regulating device 13 receives the temperature signal detected by the temperature detecting device 12 and the signal for the supply of power to the auxiliary induction coil 3, and thus controls the amount of electric supply to the induction coil at the melting section. Specifically, the power regulating device 13 receives the temperature signal sent from the temperature detecting device 12, and acts to increase the power when the temperature of the effluent molten metal decreases, and acts to decrease the power when it rises. By so doing, the temperature of the effluent molten metal is maintained at the prescribed value and at the same time, the power to be supplied to the induction coil 5 is controlled in order to prevent fluctuation in the temperature of the effluent molten metal by the supply of power to the auxiliary induction coil 3. The amount of heat supplied to the molten metal from the coil is proportional to the square of the current flowing in the coil, and therefore, the total amount of heat $H_T$ to be supplied to the molten metal from the coils 3 and 5 is expressed by the following equation.

$H_T = K_3 I_3^2 + K_5 I_5^2$ wherein $K_3$ and $K_5$ are constants of the coils 3 and 5, and $I_3$ and $I_5$ are the currents flowing through the coils 3 and 5.

Figure 2:
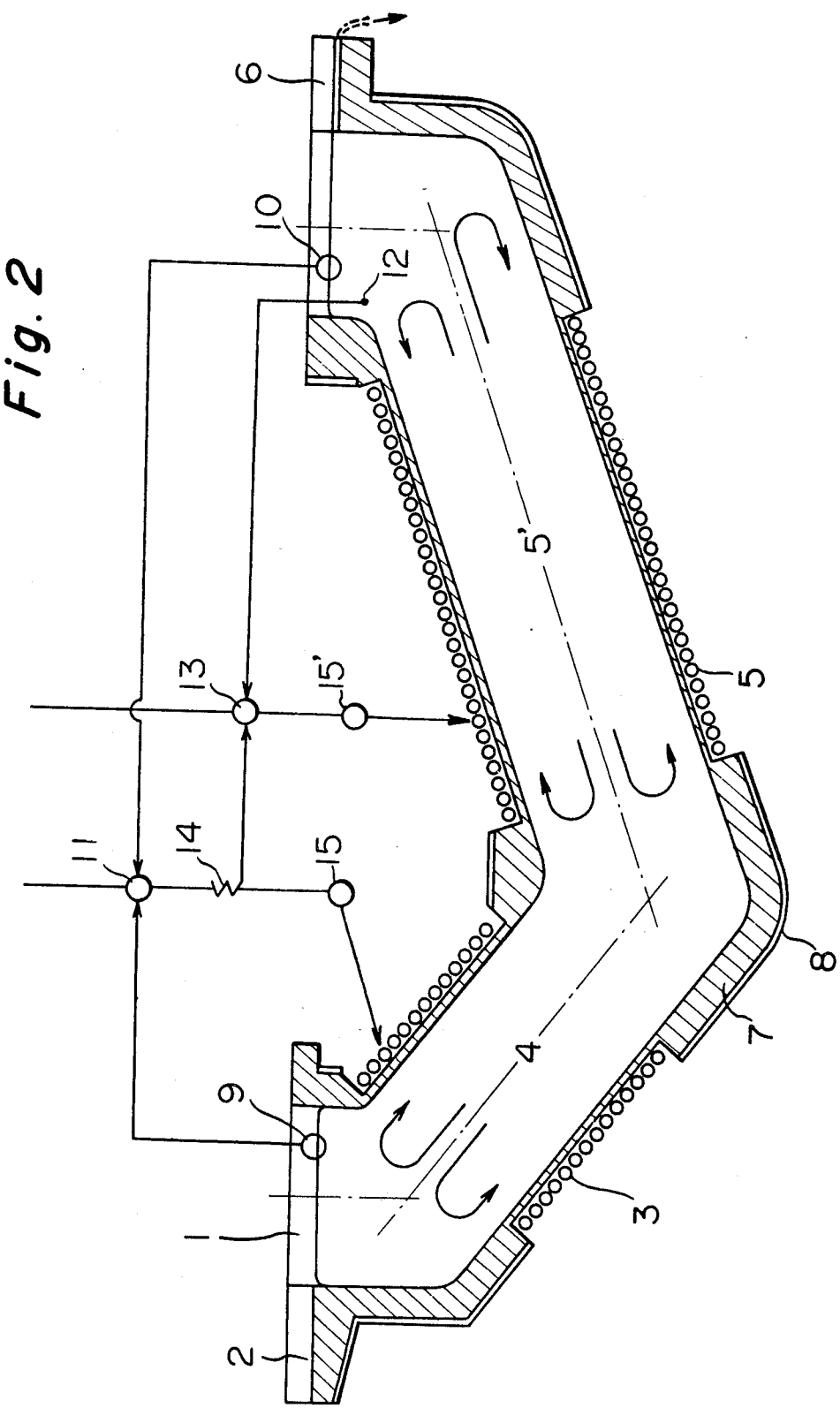
FIG. 2 is a schematic view in longitudinal section of a V-shaped furnace.

The furnace shown in FIG. 2 is the same as that shown in FIG. 1 except that it is V-shaped.

The furnace of this invention makes it possible to melt metals and alloys continuously with stable and efficient out flow of molten metals. The furnace is used as a melting furnace for continuous melting of cast iron and steel and is a continuous casting process, where molten metals are continuously supplied at a constant temperature and in a constant flow rate from the furnace to the subsequent step. The present invention, therefore, provides high energy efficiency.

Moreover, by operation of the auxiliary induction coil, positive agitation of the molten metal at the material feeding section is possible in the present invention. Such agitation has not been possible with the conventional transverse type furnaces. In conjunction with induction heating at this part, stable melting can be performed even when the shape of the material differs. By using the furnace of this invention, the yields of added alloy elements are improved, the ingredients and temperature are made uniform, and by the increase in the melting ability per unit amount of the molten metal residing in the furnace, the average residence time of molten metal decreases while the thermal efficiency is increased. Furthermore, since a downwardly directed force based on the formation of progressive magnetic field is exerted, bridging can be prevented, and the control of the amount of flow of the molten metal can be adjusted. By balancing the electric power supply to the induction coil 5 and the auxiliary induction coil 3, molten metal maintained at a constant temperature can be supplied with high efficiency. The discharge of slag can be simplified by exerting an upwardly directed force based on the formation of progressive magnetic field or pinch effect.

What is claimed is:

1. An induction melting furnace for melting a furnace charge, comprising:
   a material charging section;
   a main melting section equipped with a first induction coil for melting the furnace charge by induction heating;
   a molten metal effluent section;
   an auxiliary induction coil for promoting melting of the material by additional heating of the material and molten metal at the material charging section, said auxiliary coil including a change-over device supplying monophase alternating current to said coil to exert upwardly and downwardly directed forces on the material and molten metal in the material charging section by virtue of a pinch effect and said change-over device supplying upwardly and downwardly directed forces on the material and molten metal by virtue of a progressive magnetic field impressed thereon; and
   a control system for controlling the flow rate of the molten metal effluent, wherein said system incorporates a device for detecting the flow rate of the molten metal effluent, a device for detecting the liquid level of the material charging section and means for regulating electric power supplied to the auxiliary induction coil and, further, wherein said regulating means is operated by signals from the flow rate detecting devices and the liquid level detecting device.

* * * * *

UNITED STATES PATENT OFFICE
CERTIFICATE OF CORRECTION

Patent No. 3,917,896  Dated November 4, 1975

Inventor(s) NAKAGAWA ET AL

It is certified that error appears in the above-identified patent and that said Letters Patent are hereby corrected as shown below:

Foreign application priority data should read
-- Oct. 11, 1972 --

Signed and Sealed this

*third* Day of *February 1976*

[SEAL]

*Attest:*

RUTH C. MASON
*Attesting Officer*

C. MARSHALL DANN
*Commissioner of Patents and Trademarks*